United States Patent
Wojtunik

(10) Patent No.: US 10,715,676 B2
(45) Date of Patent: Jul. 14, 2020

(54) DISTRIBUTED SENSOR SYSTEM

(71) Applicant: SAFE-COM WIRELESS, Holmdel, NJ (US)

(72) Inventor: Henry Wojtunik, Holmdel, NJ (US)

(73) Assignee: SAFE-COM WIRELESS, Holmdel, NJ (US)

( * ) Notice: Subject to any disclaimer, the term of this patent is extended or adjusted under 35 U.S.C. 154(b) by 0 days.

(21) Appl. No.: 16/304,445

(22) PCT Filed: May 26, 2017

(86) PCT No.: PCT/US2017/034650
§ 371 (c)(1),
(2) Date: Nov. 26, 2018

(87) PCT Pub. No.: WO2017/205723
PCT Pub. Date: Nov. 30, 2017

(65) Prior Publication Data
US 2019/0149664 A1    May 16, 2019

Related U.S. Application Data

(60) Provisional application No. 62/342,048, filed on May 26, 2017.

(51) Int. Cl.
*H04M 11/00*  (2006.01)
*H04B 1/38*  (2015.01)
(Continued)

(52) U.S. Cl.
CPC ............ *H04M 11/007* (2013.01); *H04B 1/38* (2013.01); *H04B 10/079* (2013.01);
(Continued)

(58) Field of Classification Search
CPC .. H04M 11/002; H04M 11/007; H04M 11/00; H04B 10/079; H04B 1/38; H04B 10/2575; H04L 12/40
(Continued)

(56) References Cited

U.S. PATENT DOCUMENTS 4,234,969 A * 11/1980 Singh .................. G02B 6/2817
  385/24
5,929,896 A * 7/1999 Goodman ............. H04M 11/00
  348/14.12
(Continued)

FOREIGN PATENT DOCUMENTS

CN    104065404 A    9/2015
CN    104981985 A    10/2015
(Continued)

OTHER PUBLICATIONS

Preliminary Rejection issued in corresponding Korean Patent Application No. 10-2018-7037120 dated Jan. 23, 2020, consisting of 11 pp. (English Translation Provided).
(Continued)

*Primary Examiner* — Melur Ramakrishnaiah
(74) *Attorney, Agent, or Firm* — Volpe and Koenig, P.C.

(57) ABSTRACT

A distributed sensor network that utilizes the cabling infrastructure installed for a Distributed Antenna System ("DAS") to collect environmental data about a building. In this sensor network, an array of sensors are placed in line with the DAS communication cabling so that additional cabling is not required. The sensors use "out of band" frequencies or low level signaling so as to not interfere with the DAS signals to communicate the sensor data to the DAS head-unit.

20 Claims, 13 Drawing Sheets

(51) Int. Cl.
*H04B 10/2575* (2013.01)
*H04L 12/40* (2006.01)
*H04B 10/079* (2013.01)

(52) U.S. Cl.
CPC ......... *H04B 10/2575* (2013.01); *H04L 12/40* (2013.01); *H04M 11/00* (2013.01); *H04M 11/002* (2013.01)

(58) Field of Classification Search
USPC .... 379/102.01–102.3, 102.7; 455/67.4, 67.1, 455/423, 562
See application file for complete search history.

(56) References Cited

U.S. PATENT DOCUMENTS

| | | | |
|---|---|---|---|
| 9,247,543 | B2 | 1/2016 | Berlin et al. |
| 9,312,941 | B2 | 4/2016 | Soriaga et al. |
| 2002/0075906 | A1 | 6/2002 | Cole et al. |
| 2002/0155818 | A1* | 10/2002 | Boros ............... H01Q 1/246 455/67.14 |
| 2002/0155848 | A1 | 10/2002 | Boros et al. |
| 2004/0198386 | A1 | 10/2004 | Dupray |
| 2005/0186937 | A1* | 8/2005 | Graham ............ H04L 12/66 455/404.1 |
| 2006/0251115 | A1 | 11/2006 | Haque et al. |
| 2012/0011365 | A1 | 1/2012 | Schmidt et al. |
| 2012/0069880 | A1 | 3/2012 | Lemson et al. |
| 2012/0293390 | A1 | 11/2012 | Shoemaker |
| 2013/0288592 | A1 | 10/2013 | Ben-Tolila |
| 2014/0153674 | A1 | 6/2014 | Stratigos |
| 2014/0376499 | A1* | 12/2014 | Kummetz ........... H04W 24/02 370/329 |
| 2016/0112132 | A1* | 4/2016 | Gerszberg ........... H01Q 21/50 398/116 |
| 2017/0223433 | A1 | 8/2017 | Busslinger |

FOREIGN PATENT DOCUMENTS

| | | |
|---|---|---|
| CN | 106330233 A | 1/2017 |
| CN | 106463822 A | 2/2017 |
| JP | 2014519269 A | 8/2014 |

OTHER PUBLICATIONS

Office Action issued in corresponding Chinese Patent Application No. 201780032573.4 dated Apr. 27, 2020 consisting of 19 pp. (English Translation Provided.

* cited by examiner

DISTRIBUTED SENSOR SYSTEM

CROSS REFERENCE TO RELATED APPLICATION(S)

This application claims the benefit of U.S. provisional application No. 62/342,048 filed on May 26, 2016 which is incorporated by reference as if fully set forth.

FIELD OF INVENTION

The invention relates to a system and a method for collecting data from and sending commands to an array of sensors and functional devices in a building.

BACKGROUND

A Distributed Antenna System ("DAS") is a network of spatially separated antenna nodes connected to a head-end unit via a transport medium that enables bi-directional communication with wireless devices (such as mobile phones or emergency services radios) within a structure. The DAS system enables communication networks (e.g., mobile phone networks and emergency radio networks) outside the structure to communicate wirelessly within the structure.

When transmitting data from a wireless device to the head-unit using the DAS, at least one antenna node wirelessly receives an electromagnetic signal transmitted from a wireless device using any wireless communication standard known in the art (e.g., 802.11, 3G, UHF, etc.). The received signal is then transmitted to a Remote Unit as an analog/RF signal that includes the data transmitted from the wireless device. The Remote Unit then processes the received signal and transmits the data to a head-unit via a backhaul cabling to the head-unit. The head-unit then relays the information to an external communication network or internally within the same facility to communicate the data to other persons or equipment.

When transmitting data from the external network to the wireless device using the DAS, the head-unit receives the data from external network. The head-unit then relays the information to the Remote Units via the backhaul cabling. The Remote Units receive the data from the head-unit and transmit the data as an analog signal to the antenna nodes. The antenna nodes then propagate the analog signal as electromagnetic wave that is received by the wireless device.

SUMMARY

Embodiments of the present invention utilize the distributed equipment and the cabling infrastructure of the DAS to enable a plurality of sensors to control functional devices within the sensors (such as relays or alarms) and communicate information collected about the conditions within a building to and from a head-unit without the need for additional cabling or infrastructure.

DETAILED DESCRIPTION OF THE PREFERRED EMBODIMENTS

Figure 1:
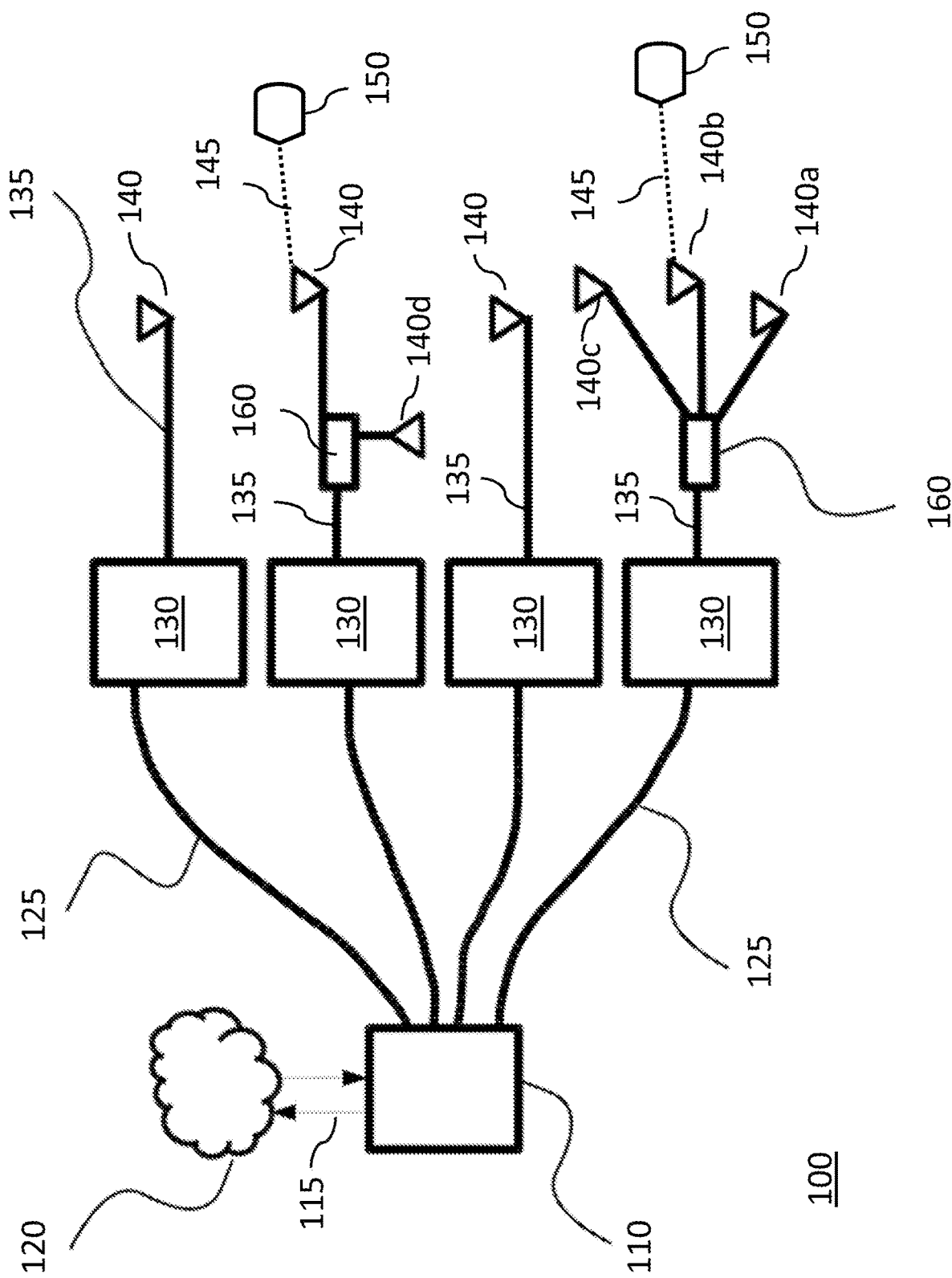
FIG. 1 is a graphical depiction of an example of a typical Distributed Antennae System ("DAS").

FIG. 1 depicts a typical Distributed Antenna System ("DAS") 100 that is well known in the art. The DAS 100 includes a head-unit 110 that is connected to an external communication network 120 by an external communication link 115. The external communication network 120 may be an emergency communication network (such as a donor antenna for an APCO25 digital radio standard, a trunked radio network, a two-way conventional FM radio or a FirstNet Network), a mobile phone network (such as a 3G wireless network or the like), the internet or any similar communication network. The external communication link 115 may be a wired connection (e.g., electrical, coaxial, Ethernet, twisted pair, etc.) or may be a wireless connection (e.g., FM, digital radio, 802.11, LTE, etc.).

The head-unit 110 is further connected to Remote Units 130 by backhaul cabling 125. The backhaul cabling 125 may be Ethernet, Fiber optic, coaxial or any other cable known in the art. The Remote Unit 130 bi-directionally communicates with the head-unit 110. For example, the Remote Unit 130 receives data from the head-unit and transmits the data to one or more antennas 140 via DAS cable 135. The DAS cable 135 may be either RF Coaxial, Ethernet or similar communication cabling known in the art. The Remote Unit 130 may be connected to a plurality of antennas 140a, 140b and 140c, etc. using a splitter 160. The splitter 160 may have 2 or more splits with multiple antenna connected such as antenna 140 and 140d shown. The plurality of antennas 140 transmit data to one or more wireless clients 150 using a wireless communication channel 145. The one or more wireless clients 150 may be mobile phones, laptop computers, emergency radios or any similar device. The wireless communication channel 145 may utilize a mobile phone communication protocol (e.g., 4G, 3G, CMDA, etc.) and/or may utilize an emergency radio protocol (e.g., APCO25) or other wireless protocols like LoRaWAN™. Therefore, the wireless clients 150 can both transmit and receive information with the external communication network 120.

Figure 2:
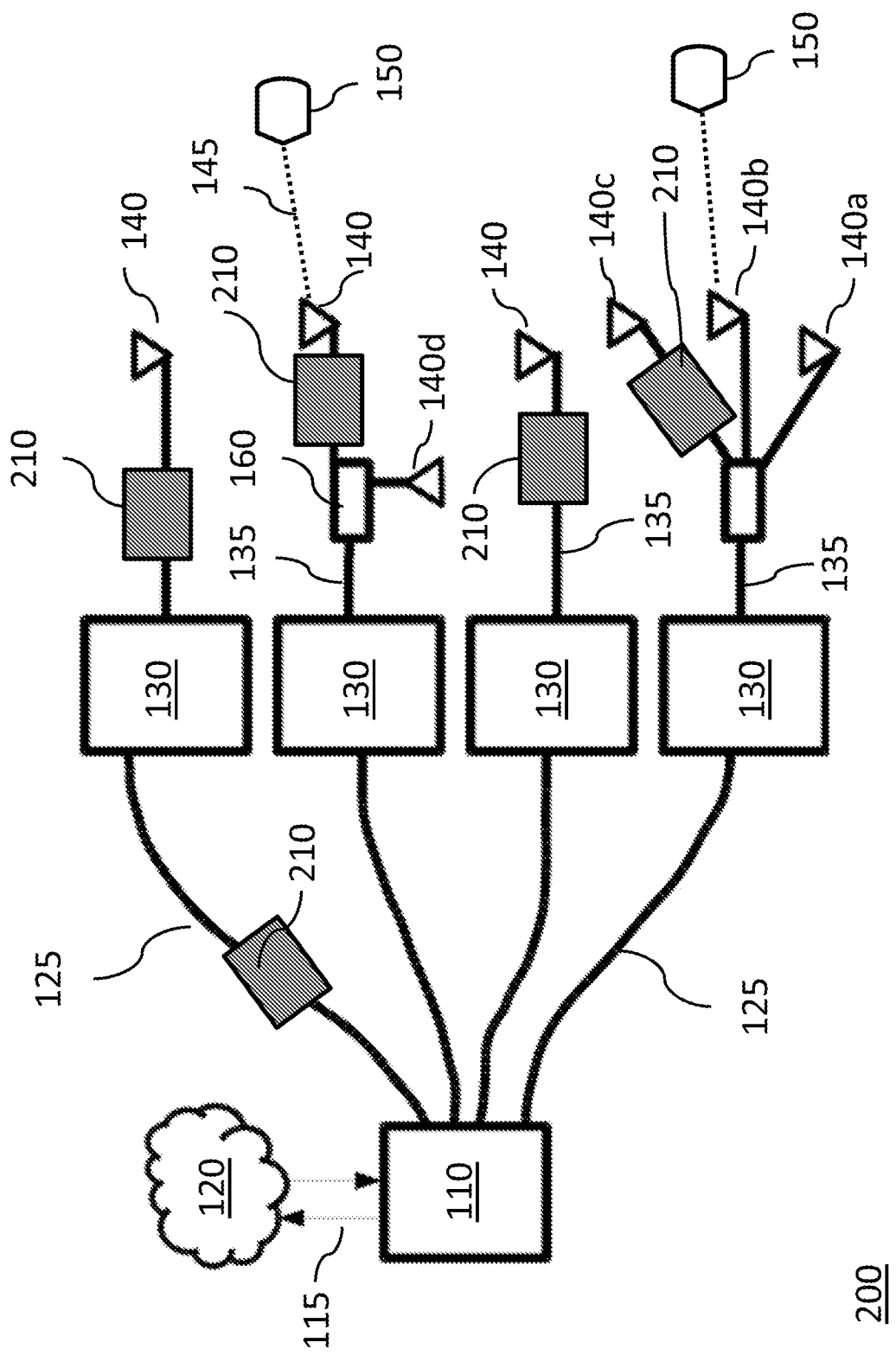
FIG. 2 is a graphical depiction of an example of a distributed sensor and control network installed in a Distributed Antennae System ("DAS").

FIG. 2 shows an example distributed sensor and control network 200. The distributed sensor and control network 200 includes the DAS 100 and introduces a plurality of remote sensors 210. These remote sensors are installed in-line with the Remote Unit 130, DAS cable 135 and or backhaul cable 125. The remote sensors 210 collect data on the conditions in the building near where the sensors are installed and transmit the data to the head-unit 110. The remote sensor 210 may incorporate sensors, detectors and/or various input or output means and convert the signals into a digital or similar signal that is transmitted to the head-unit 110 or vice versa. The sensors may collect data on temperature, humidity, heat, smoke, fire, gas (oxygen, methane, chlorine, etc.), motion, biological hazards, nuclear hazards, etc. The remote sensors 210 may transmit the collected data to the head-unit 110. The head-unit 110 may further transmit the collected data to the external communication network 120 or other parallel network.

Additionally, in some embodiments, the remote sensor 210 can receive a signal over DAS cable 135 and control output devices such as relays, alarms, lights, or various control signals for electronic or mechanical devices. For example, the remote sensor 210 may accept commands from the head-unit 110 or an offsite device connected to the sensor network, and turn on a battery backup system, or open all the doors in the case of an evacuation, or alternatively, turn on a fire alarm to indicate a fire and notify personnel of an emergency situation.

Figure 3:
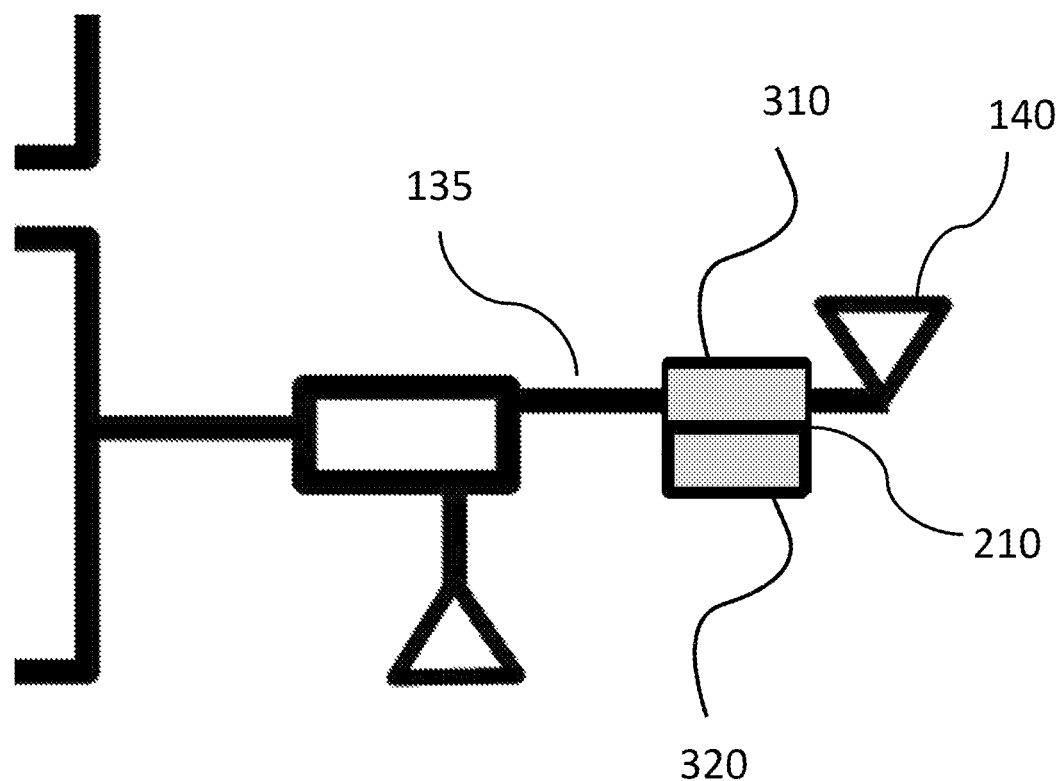
FIG. 3 is a block diagram of an example Remote Sensor.

The remote sensor 210 includes a Connection to DAS ("CtD") module 310 and a Remote Sensor & Control ("RSC") module 320 as shown in FIG. 3. The CtD 310 takes data collected by the RSC 320 and injects the data onto the DAS cable 135 without interfering with the RF signal carried by the DAS 100. In addition, the CtD 310 may also extract data from the DAS cable 135 and transmit the extracted data to the RSC 320. There are several embodiments of a CtD, as shown in FIGS. 5-9, that may be selected depending on the type of infrastructure employed in the DAS 100 and depending on the injection point and type of data communication implemented by the DAS 100.

Figure 4:
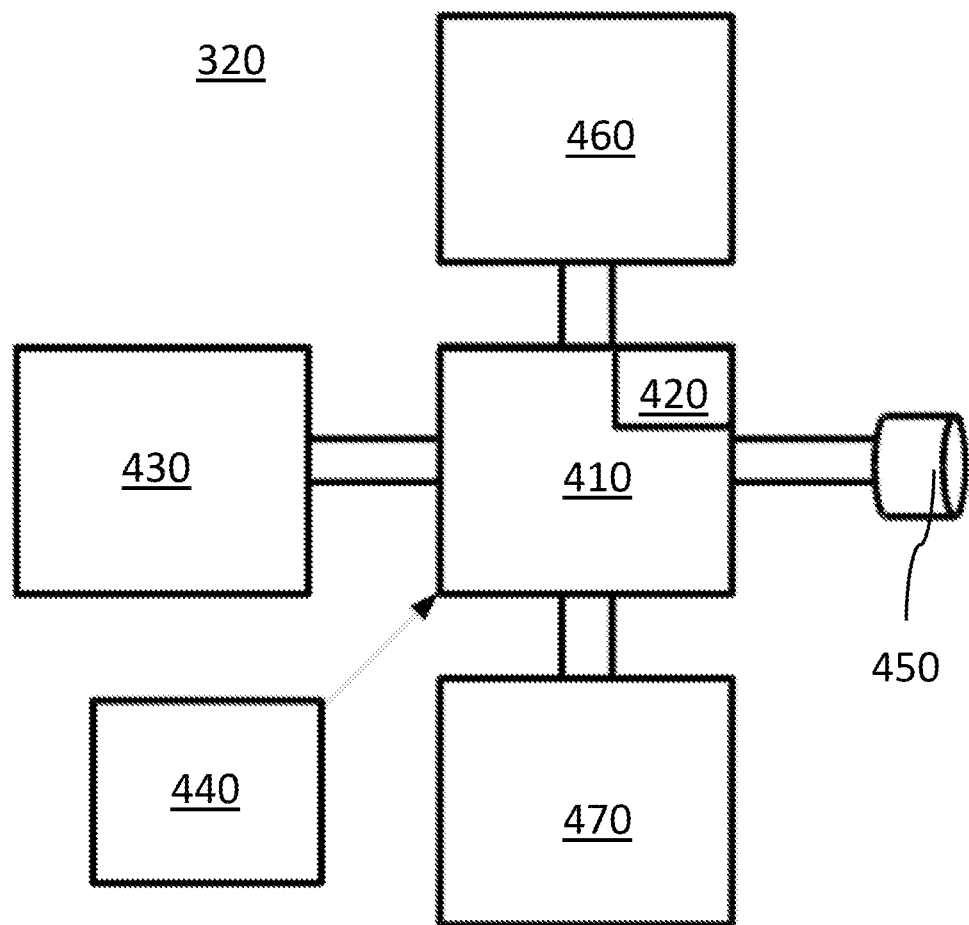
FIG. 4 is a block diagram of an example of a Remote Sensor and Control Unit ("RSC").
Figure 10:
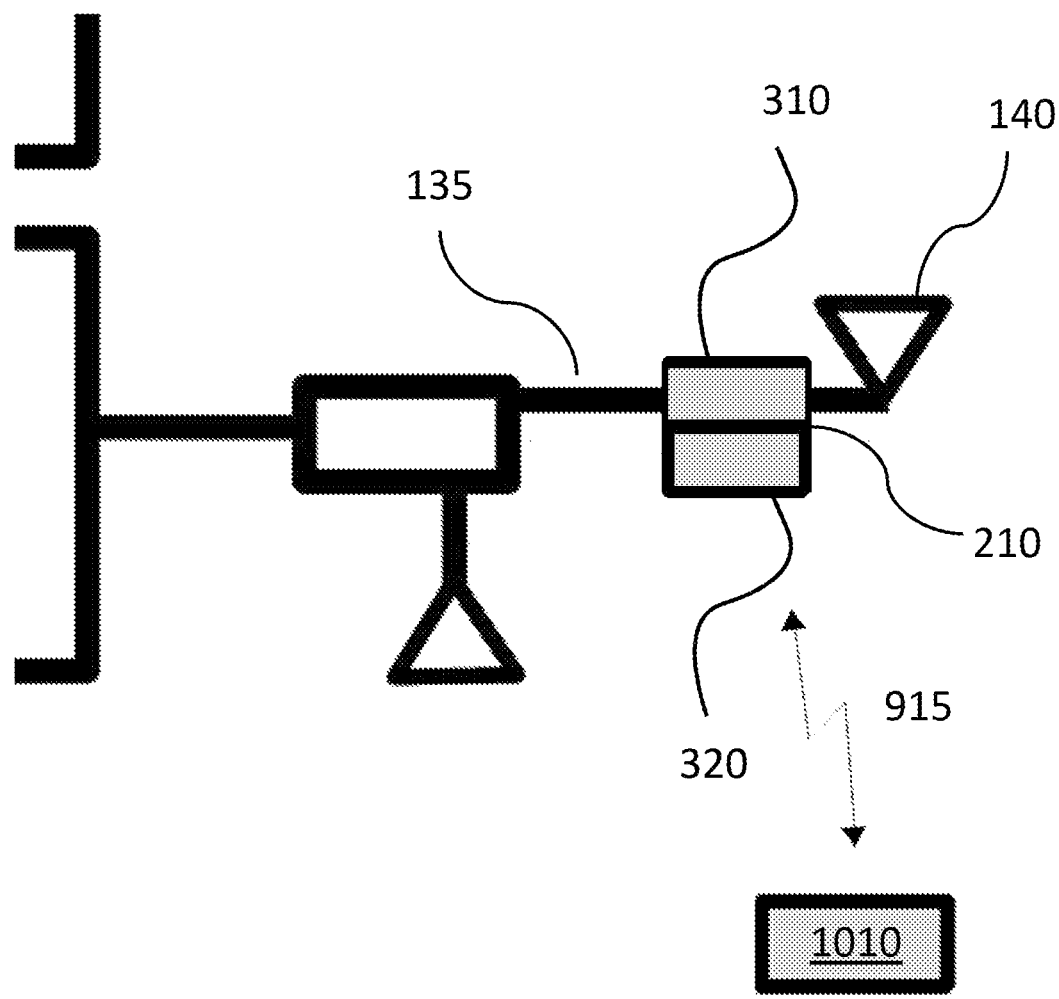
FIG. 10 is a block diagram of an embodiment of a system that includes a Detached Sensor & Control device ("DSC").

FIG. 4 shows an example embodiment of the RSC 320. The RSC 320 may include a processor 410 that is connected to a memory 420, a CtD interface 460. The CtD interface 460 enables the RSC 320 to communicate via the CtD 310. In some embodiments, the processor is further connected to a wireless communication interface 430. The wireless communication interface 430 enables the RSC 320 to communicate with a Detached Sensor & Control device ("DSC") as shown in FIG. 10. In some embodiments, the processor 410 is further connected to relays 470 or other output devices. The relays 470 may be used to control one or more external systems such as door locks. The processor 410 is further connected to a probe 450 that measures one or more environmental parameters near the probe 450. The memory 420 may store calibration information for the probe 450. The processor 410 may store data collected by the probe 450 in the memory 420. In some embodiments, the RSC 320 may be powered by a local external power adapter 440. In other embodiments, the RSC 320 may be powered by the CtD 310 via the DAS cable 135. The processor 410 may retrieve the data stored in the memory 420 and transmit the data to the head-unit 110 using the CtD interface 460. In some embodiments, the processor 410 may poll for information, receive data, send data, enable, disable, modify operating features of the probe 450. The processor 410 may also control external systems with the relays 470 or other control elements based on the data and responses or non-responses from the probe 450. In addition, the processor 410 may also control external system with the relays 470 based on instructions sent from the head-unit 110 or from the Remote Unit 130. Further, the processor 410, using the wireless communication interface 430, may respond to requests from the head-unit 110 or the external communication network 120. In some embodiments, the memory 420 may store instructions that enable the processor 410 to properly communicate with an external network (via text, phone, internet, etc.).

Figure 5:
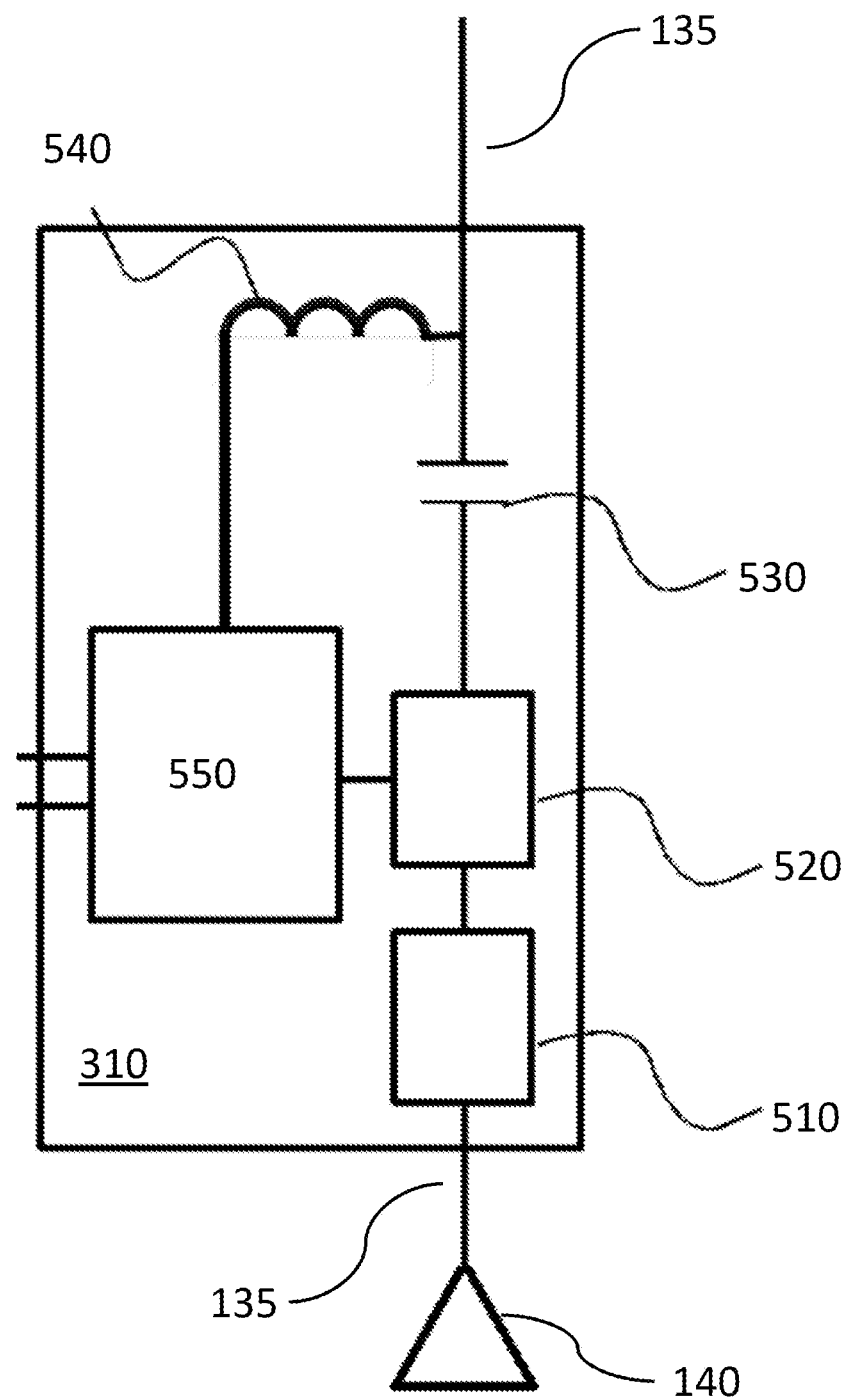
FIG. 5 is a block diagram of an example embodiment of a Connection to DAS ("CtD") module.

FIG. 5 shows an example embodiment of the CtD 310 that may be used with DAS cable 135 that is non-optical (e.g., RF coaxial, Ethernet, twisted pair, etc.) In this embodiment, the CtD 310 may include an inductor filter 540 connected to the DAS cable 135 that filters electrical signals transmitted from the head-unit 110 prior to the signals being received by a bidirectional RF coupler 520. The inductor filter 540 may filter out the RF signal and allow a DC power signal to pass to an interface circuit 550. In this embodiment, the local external power adapter 440 is not required because the CtD 310 and RSC 320 are powered by the DC power signal. In some embodiments, the CtD 310 may include a capacitor 530 connected to the DAS cable 135 that receives electrical signals transmitted from the head-unit 110 prior to the signals being received by the antenna 140. The capacitor 530 filters out a DC power signal and allows the RF signal to pass to a bidirectional RF coupler 520. In some embodiments, the inductor filter 540 and the capacitor 530 may be omitted when the RSC 320 is powered using a local external power adapter 440. The interface circuit 550 enables the CtD 310 to communicate with the RSC 320. The interface circuit 550 may include filters, impedance matching, amplification, attenuation, conversion or other circuitry required to properly interface the RSC 320.

The interface circuit 550 may further receive data from the RSC 320 that corresponds to measurement data collected by the probe 450. The interface circuit 550 may then convert the received data to a transmittable signal that is suitable for transmission over the DAS cable 135 to the head-unit 110. The transmittable signal may be a frequency modulated signal (FM) (such as FSK, or On-Off keyed frequency signal), a digital signal (1's and 0's), an audio signal, a pulsed signal, an analog optical signal, or any other type of signal that can be communicated over the DAS cable 135. In some embodiments, the frequency of the transmittable signal is fixed to an "out of band" frequency that is determined to not interfere with the RF signals or other type signals of the DAS 100. In other embodiments, the "out of band" frequency is set using switches or buttons (not pictured) on the CtD 310. In another embodiment, the "out of band" frequency is set based on a command received from the head-unit 110 or the RSC 320.

The interface circuit 550 then uses the bidirectional RF coupler 520 to transmit the transmittable signal at the "out of band" frequency to the head-unit 110 via the DAS cable 135. The bidirectional RF coupler 520 may be of any form known in the art for use in RF applications. In some embodiments, it may be desirable for the bidirectional RF coupler 520 to have a known coupling ration (such as 10 dB, 30 dB, 50 dB, etc.) so as to provide a consistent signal coupling onto and off of the DAS cable 135. This may be particularly useful when the DAS cable 135 is coaxial cable. In some embodiments, the bidirectional RF coupler 520 may introduce the transmittable signal into the DAS cable 135 or backhaul cable 125 without severing the cable.

In some embodiments, the remote sensor 210 sends the collected sensor data via an RF subcarrier onto the DAS cable 135. This subcarrier is combined with the uplink signal of the radio system that the DAS supports. The sensor data radio subcarrier is selected such that it does not interfere with the radio system frequencies. Therefore, the RF sensor data will arrive at the Remote Unit 130 as an RF (radio frequency) form and the Remote Unit 130 will process the received sensor data in the same fashion as the radio system signal from the wireless clients 150. For example, the Remote Unit 130 may convert the sensor data signal along with the radio system signal into an optical signal and forward the combined information to the Head-Unit 110 over the backhaul cable 125. Therefore, no additional electronics are required at the Remote Unit 130 to process the sensor data. In some embodiments, the Remote Unit 130 is not required to interpret and act upon the sensor data as the processing of the sensor data is performed by the Head-Unit 110. In some embodiments, a Remote Unit 130 may bi-directionally communicate the sensor and control data with other Remote Units 130.

In other embodiments, the Remote Unit 130 can detect and interpret the sensor data transmitted by the remote sensor 210 and thereby act upon the sensor data received. For example, the Remote Unit 130 may be able to determine that an alarm condition was detected by the remote sensor 210 and respond by enabling the appropriate response, e.g., enabling an alarm, switching to backup batteries, or sending a signal to the remote sensor 210 to close doors or other type responses.

In embodiments where the communication between the Remote Unit 130 and the Head-Unit 110 over the backhaul cable 125 utilizes digital optical transport, the Remote Unit 130 may convert the radio system signals into digital signals using analog to digital convertors. This digital signal would then be transmitted over the backhaul cable 125 to the Head-Unit 110. The Remote Unit 130, similarly processes the sensor signal received from the remote sensor 210 using analog to digital convertors and transmits the converted digital signal over the backhaul cable 125 to the Head-Unit 110. In many cases, the sensor data will be digital. Therefore, the sensor data would simply need to be digitally multiplexed along with the digital radio system signal. In embodiments where the sensor data is analog, the RSC 320 and the CtD 310 may convert the signal into digital format for transport. In other embodiments, the analog to digital conversion of the sensor data may occur at the Remote Unit 130. In all cases, the process is bidirectional so similar circuitry is required in both uplink and downlink directions to process and transport the radio system signal and sensor and control data.

A band pass filter 510 may also be connected along the DAS cable 135 between the bidirectional RF coupler 520 and the antenna 140. The band pass filter 510 may be configured so that the "out of band" potentially transmittable RF sensor signal is filtered out and not allowed to be transmitted to the antenna 140. In some embodiments, the band pass filter 510 may have fixed frequency bands that are allowed to be transmitted. For example, in an embodiment, the band pass filter 510 may only use frequencies that correspond to emergency services radios (e.g., APCO25 digital radio standard, a trunked radio network, a two way conventional FM radio or a FirstNet Network) to be transmitted to the antennae 140. In other embodiments, the band pass filter 510 may be dynamically tunable. In these embodiments, the band pass filter 510 is able to change which frequencies of a signal are allowed to be transmitted to antenna 140 based on a command received from the head-unit 110, the Remote Units 130 or the remote sensors 210. In other embodiments, the band pass filter 510 may have switches or buttons that allow for the band pass frequencies to be set. In other embodiments, band pass filter 510 may be omitted so as to allow passage of the sensor and control data to be sent to other remote devices wirelessly. In other embodiments, the band pass filter 510 may be selectively configured to allow for transmission of a portion or all of the sensor and control data along the DAS cable 135.

Figure 6:
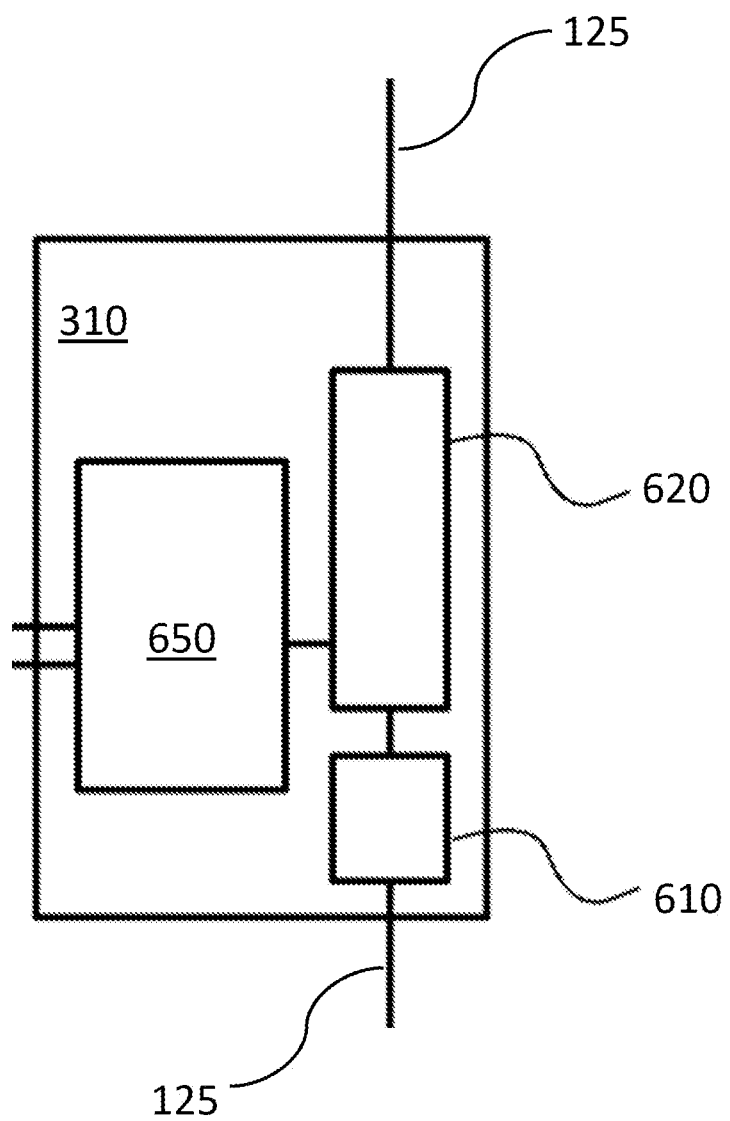
FIG. 6 is a block diagram of an example embodiment of a Connection to DAS ("CtD") module for use with optical cabling.

FIG. 6 shows another example of an embodiment of the CtD 310 that is suitable for use when the backhaul cable 125 or DAS cable 135 utilizes optical cabling. In this example embodiment, an optical coupler 620 is connected to backhaul cable 125 and optical interface circuit 650. The optical interface circuit 650 operates in a similar manner to the interface circuit 550. However, instead of an RF signal, an optical signal is received or injected. Therefore, the optical interface circuit allows data collected by the RSC 320 to be transmitted to the head-unit 110 using the optical cable. The CtD 310 may further include an optical filter 610 between optical coupler 620 and the Remote Units 130 along the backhaul cable 125. The optical filter is configured to filter out any optical signals injected by the optical coupler 620 so that the injected signal is not transmitted further down the line or received by the Remote Unit 130 and the antenna 140.

The optical coupler 620 extracts (or injects) a portion of the signal onto or off of the optical cabling of the backhaul cabling 125 or DAS cable 135. The optical coupler 620 may be of any form known in the art for other optical applications. In some embodiments, a known coupling ratio (such as 3 dB, 10 dB, 20 Db, etc.) may be selected for the coupler 620 as to provide a consistent signal coupling onto and off of the backhaul cabling 125. In some embodiments, digital RF signal from the head-unit 110 is transmitted on one wavelength and the sensor data is transmitted on another wavelength. In these embodiments, the optical coupler 620 may implement wavelength-division multiplexing to transmit the sensor and control data along the backhaul cabling 125.

Figure 7:
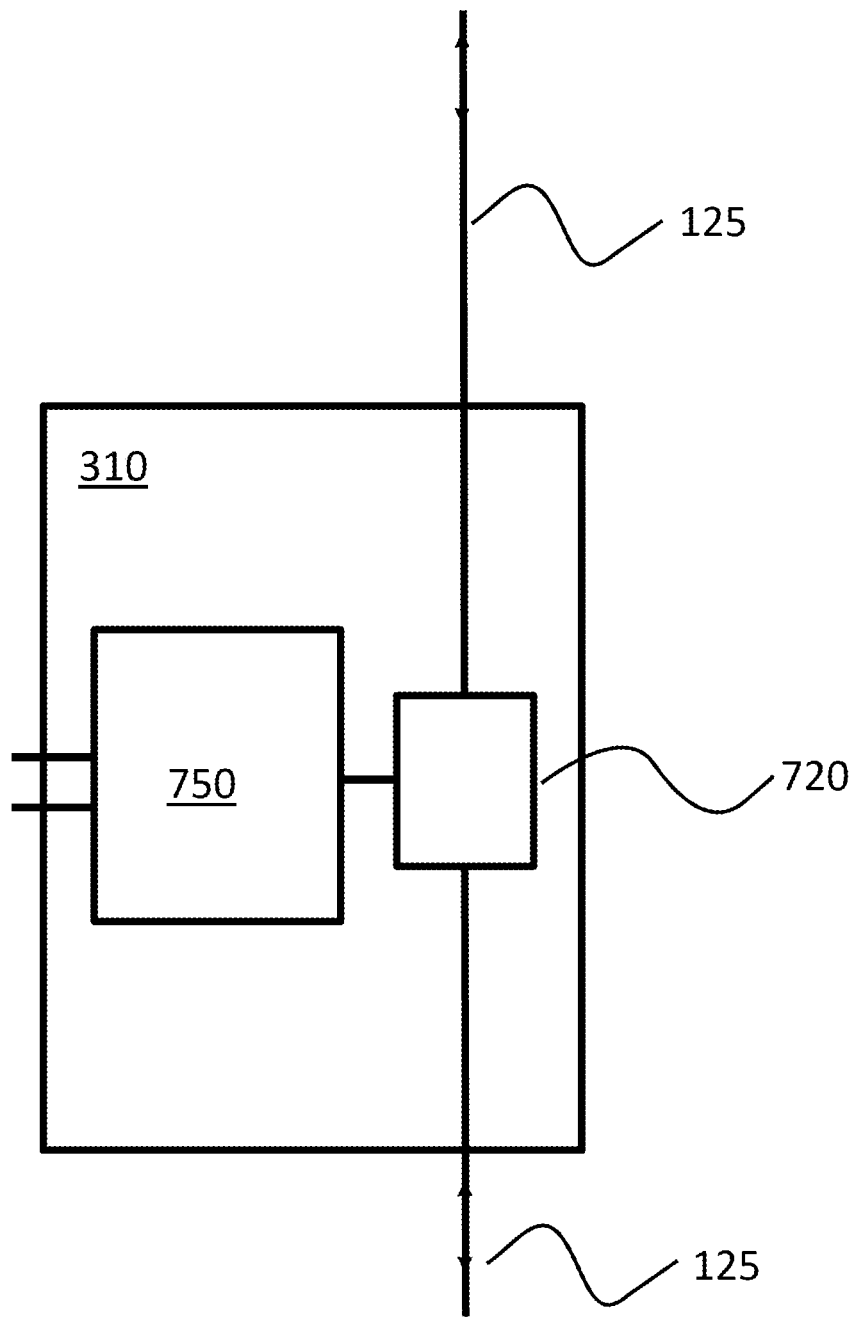
FIG. 7 is a block diagram of an example embodiment of a Connection to DAS ("CtD") module for use in a digital network.
Figure 8:
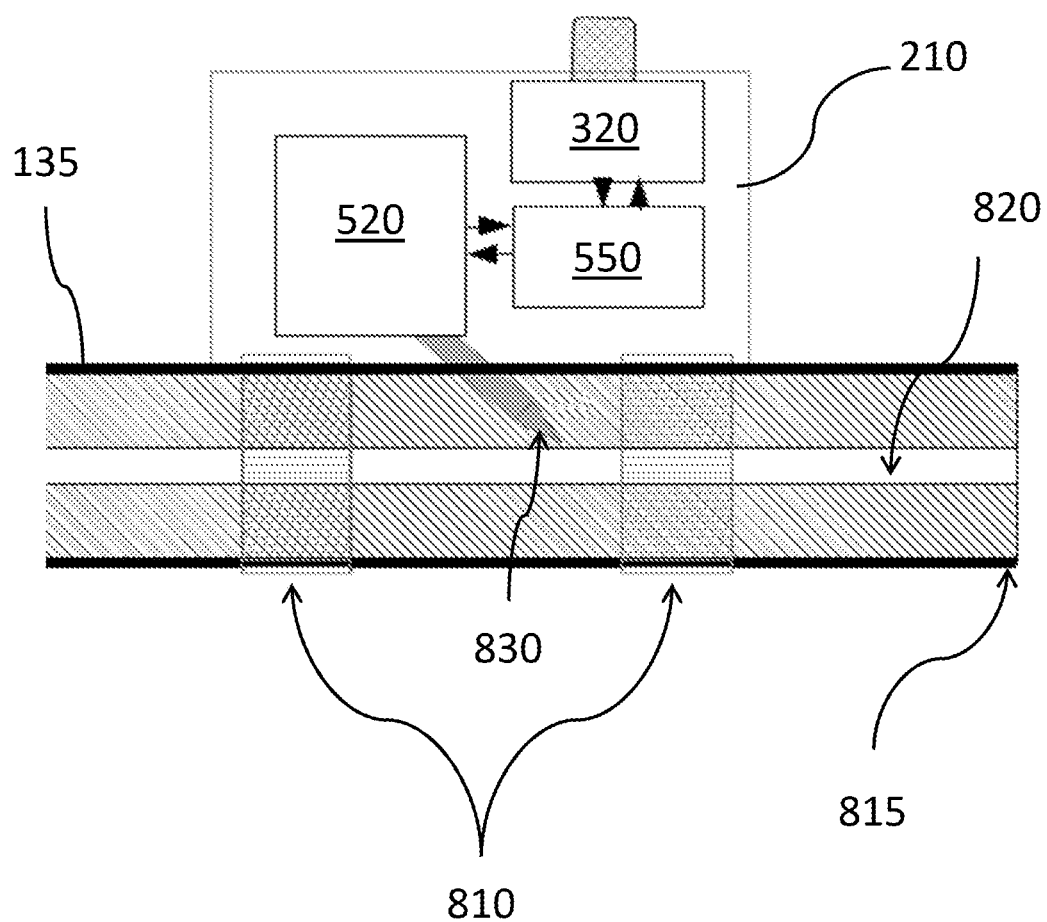
FIG. 8 is a block diagram of an example of a bidirectional RF coupler.

Another embodiment of the CtD 310 is shown in FIG. 7. This embodiment is suitable for use with a DAS 100 that utilizes digital communication between the head-unit 110 and the remote units 130 or with a DAS 100 that uses digital communication between the head-unit 110 and the antennae 140. In this example embodiment, a digital coupler 720 is connected to backhaul cabling 125 and digital interface circuit 750. The digital interface circuit 750 operates in a similar manner to the interface circuit 550. However, instead of modulating the data received from the RSC 320 as an RF signal, the digital interface circuit 750 digitizes the data received from the RSC 320. The digital coupler 720 receives the digitized data from the digital interface circuit 750 and transmits the digitized data along the backhaul cable 125. In some embodiments, the digital coupler 720 may transmit the digitized data onto the backhaul cable by multiplexing the digitized data along with the digitized RF data coming from the head-unit 110. Similarly, the digital coupler 720 may receive commands from the head-unit 110 by de-multiplexing the data and control signal on the backhaul cabling 125. In other embodiments, the digital coupler 720 may receive commands from the head-unit 110 and transmit the sensor data to the head-unit 110 using packetized data (e.g., TCP/IP packets).

Figure 9:
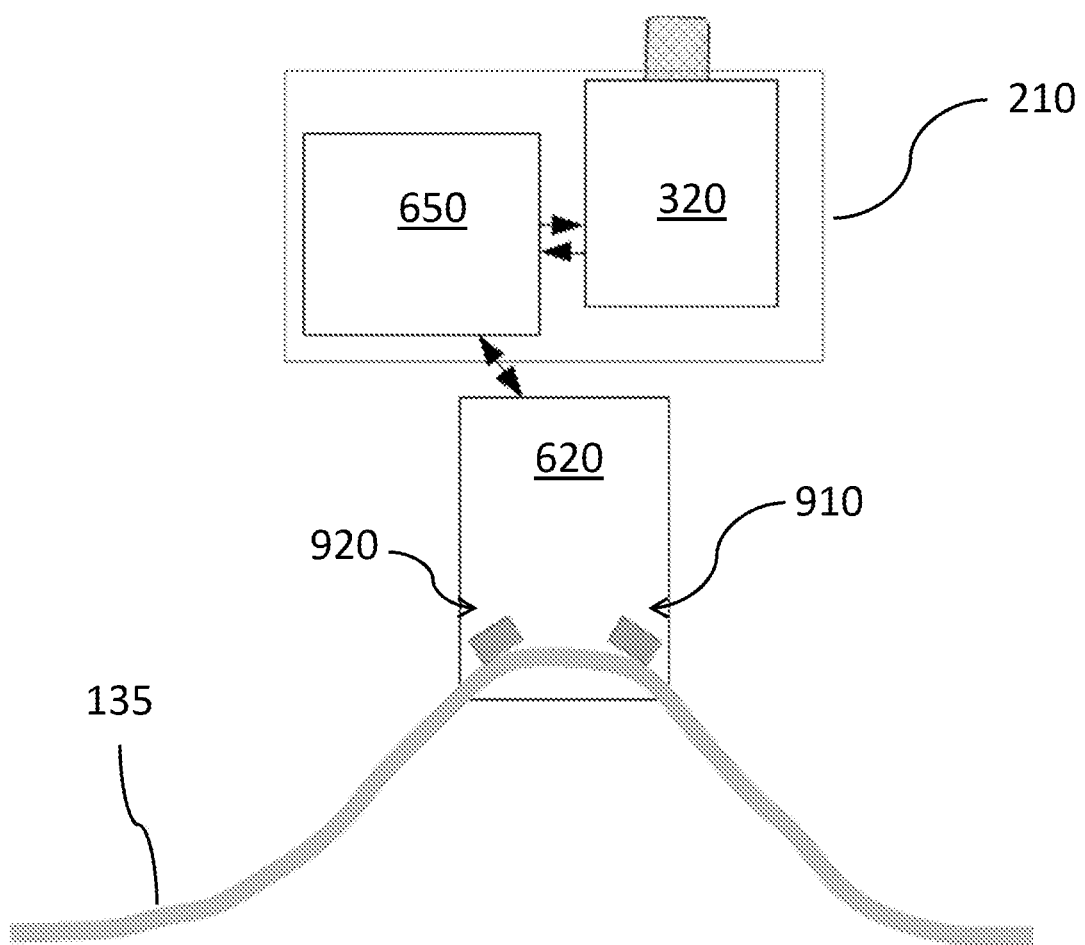
FIG. 9 is a block diagram of an example optical coupler.

In some embodiments, the CtD 310 may use a bidirectional RF coupler 520 that can inject and extract a signal from DAS cable 135 without severing the cable. For example, FIG. 9 shows an example of a bidirectional RF coupler 520 that is connected to the DAS cable 135 without severing the cable. Although coaxial cable is depicted, similar methods can be used when the DAS cable 135 is Ethernet or twisted pair cable. The bidirectional RF coupler 520 uses a probe 830 that is inserted through the ground sheathing 815 of the DAS cable 135. The remote sensor 210 may be attached to the DAS cable 135 by a mechanical means 810. The mechanical means may include straps, clips, clamps, or any other known equivalents.

The bidirectional coupling of the remote sensor 210 with the DAS cable 135 is performed by either non-contact or contact methods. In the non-contract method, the probe 830 is close to, but does not electrically touch, the center copper core of DAS cable 135. The tip of the probe 830 is insulated to assure that it does not electrically touch the center copper core 820. Yet it can be placed very close in a consistent manner to assure reliable consistent coupling of the RF signal in and out of the DAS cable 135. In the contact method, the probe 830 is impinged onto the center copper core 820 and makes an electrical connection between the center copper core 820 and the bidirectional RF coupler 520. As a result, a signal propagating in either direction can be transferred to the remote sensor 210. Proper signal leveling methods (such as attenuators or amplifiers) may also be used to assure the correct signal level for insertion into the DAS cable 135 for receiving or transmitting by the remote sensor 210.

In an example embodiment, the CtD 310 may use an optical coupler 620 that can inject and extract a signal from backhaul cabling 125 without severing the cable when the cable is an optical cable. For example, FIG. 9 shows an optical coupler 620 that couples to a backhaul cabling 125 with a small bend in the fiber cable. Bending of the fiber at the proper angle causes some of the light inside the fiber to leak out. This light can be detected by an external optical detector 920. This light can be then be demodulated by the optical interface circuit 650 to extract data that may be provided to the RSC 320. In the reverse direction, a light source such as a laser or LED 910 modulates an optical signal with sensor data acquired from the RSC 320 by the optical interface circuit 650. Similar to the light extraction method, the fiber can be bent, and this opens a means to inject light into the backhaul cabling 125.

However, a tight bend in the backhaul cabling 125 may cause a weakness in the fiber waveguide that normally keeps the light contained inside the fiber. But the bend opens a "gateway" for light to pass thru the normal light barrier restrictions in either direction. Therefore, the bend must be less than the manufacturer's minimum bend specification. This specification indicates the smallest bend allowed in the fiber before significant optical losses occur (losses outside the manufacturer's usual limits). As a result, data from the remote sensor 210 can be transferred across the backhaul cabling 125 by capitalizing on the fact that the losses are created by light escaping from the optical waveguide due to the sharp bend. Depending on the fiber type, the light coupling amount can be controlled with the amount of bending to allow for the adequate coupling of light onto and off of the fiber while minimizing the optical losses in the system.

Figure 11:
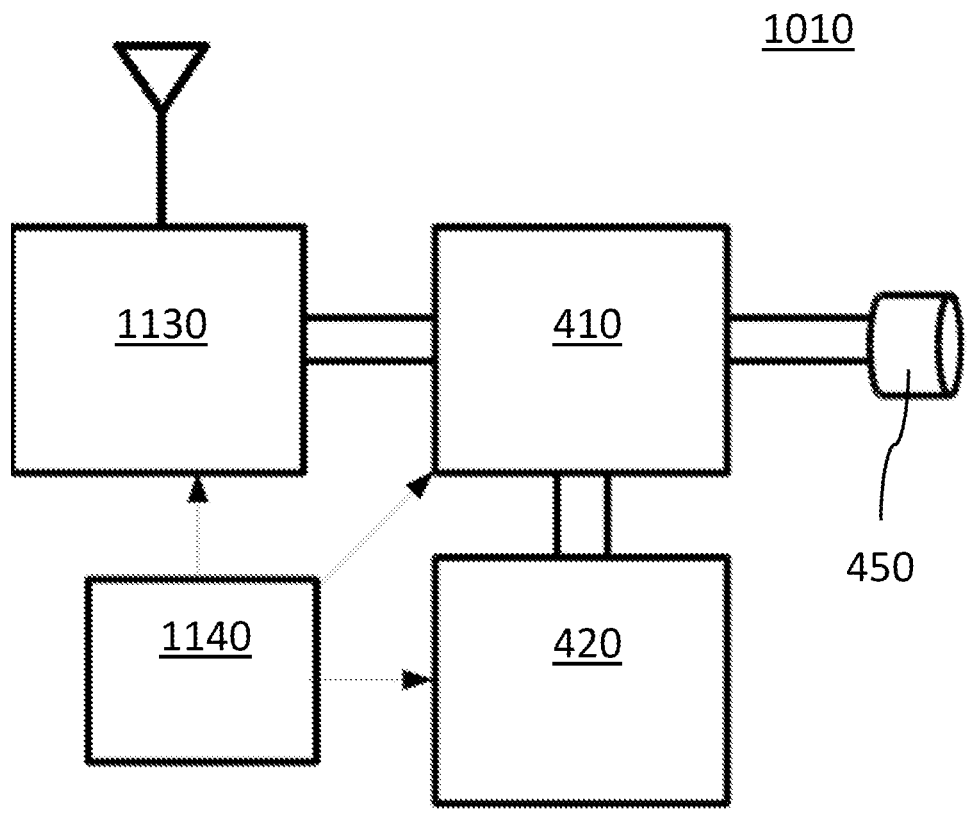
FIG. 11 is a block diagram of a Detached Sensor & Control device ("DSC").

FIG. 10 depicts example embodiment that includes a Detached Sensor & Control device ("DSC") 1010. The DSC 1010 has similar functionality and structure as RSC 320. As shown in FIG. 11, the difference between the DSC 1010 and the RSC 320 is that the DSC 1010 is not physically connected to the DAS infrastructure and, therefore, communicates with the DAS system via a wireless communications interface 1130. Also the DSC requires an external power supply 1140 such as an AC adapter or battery supply. The wireless communication interface 1130 is connected to the remote sensor 210 via a wireless communication channel 1015. The wireless communication channel can be any wireless communication standard known in the art such as (Wi-Fi, Bluetooth, Zigbee, etc.) The DSC 1010 enables the sensor and control network 200 to collect data in areas where there is not DAS cabling or equipment.

Figure 12:
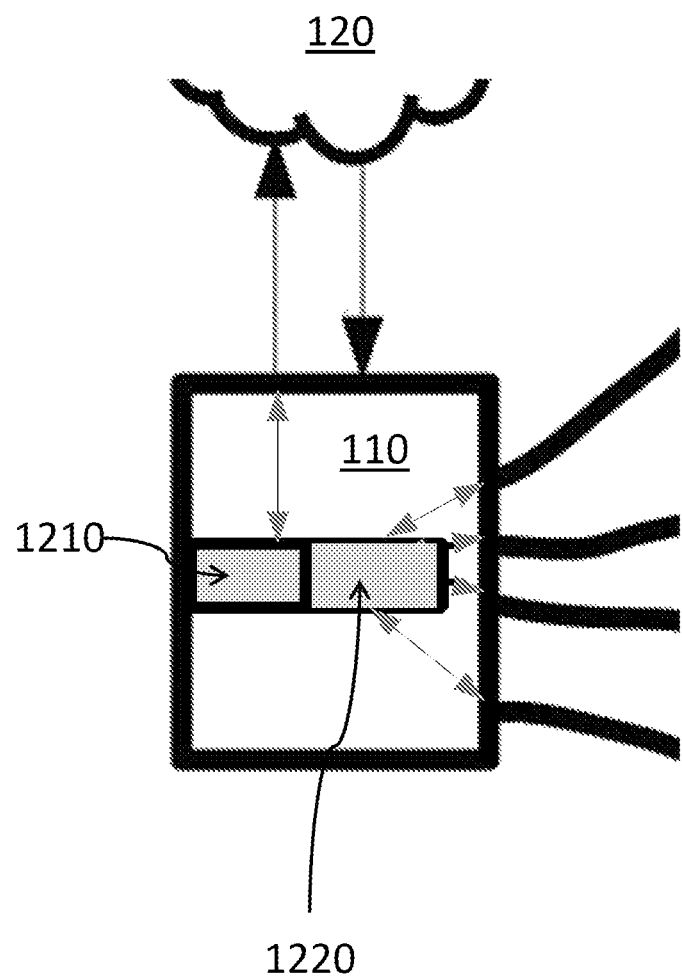
FIG. 12 is a block diagram of an example head-unit.

An example of a head-unit 110 is depicted in FIG. 12. For example, head-unit 110 includes a processor 1210 and a communication interface 1220. The communication interface 1220 enables the head-unit to commute with the external communication network 120 and the remote sensors 210. The processor 1210 receives data from the remote sensors 210 and may transmit the data to the external communication network 120 or alternatively to a computer 1310. In addition, the processor 1020 may issue commands to the remote sensor 210. These commands may cause the remote sensor 210 to transmit data stored in their memory 420, calibrate their probe 450, tune the "out of band" frequency, set the band pass filter frequency of the band pass filter 510 or other actions.

Figure 13:
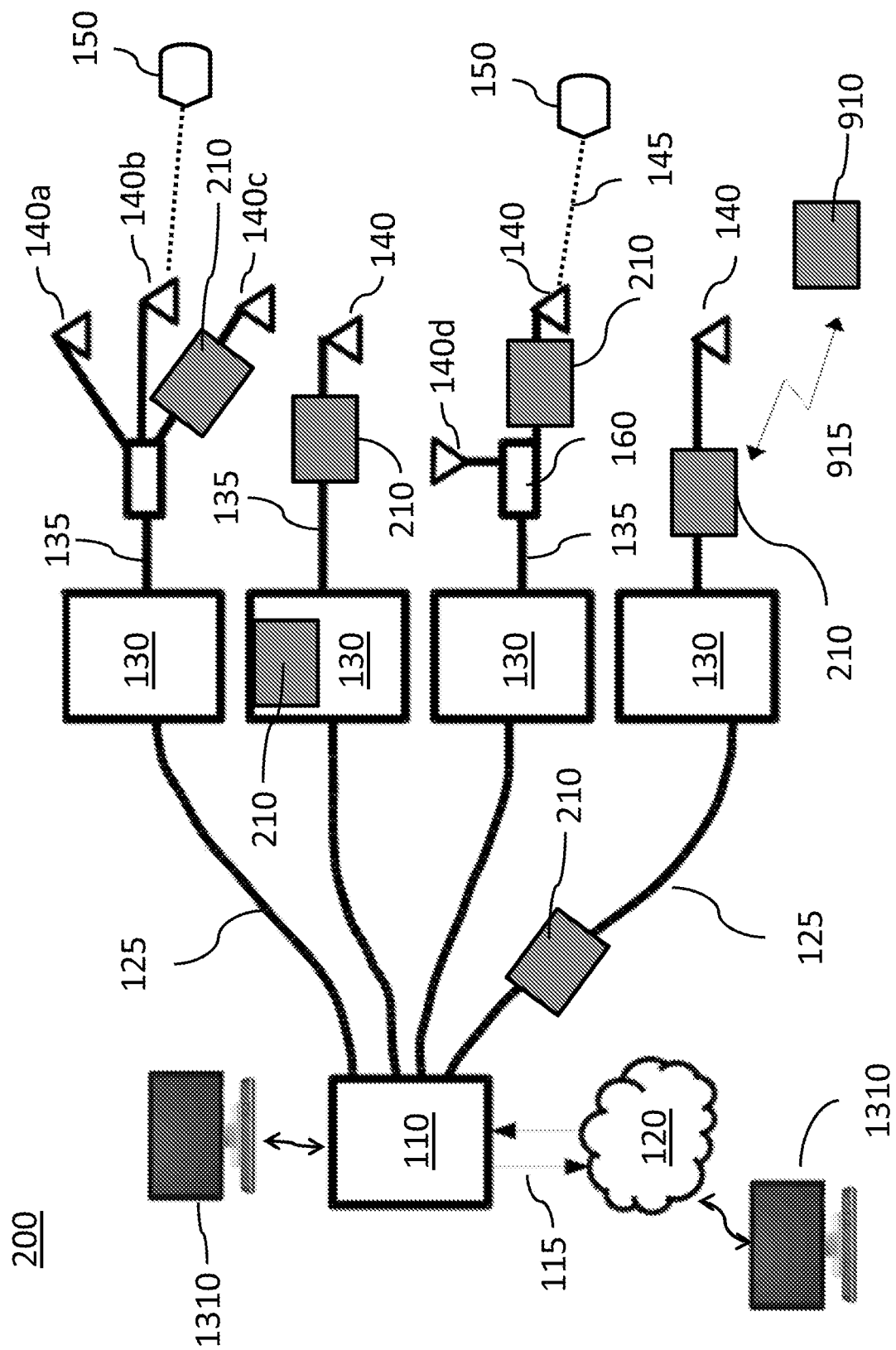
FIG. 13 is a graphical depiction of an example of a distributed sensor and control network installed in a Distributed Antennae System ("DAS") with a remote computer connection.

FIG. 13 depicts an example embodiment of the sensor and control network 200 with a DSC 1010 connected of wireless communication channel 1015. In addition, a computer 1310 may be connected to the external communication network 120. In some embodiments, the computer 1310 may be directly connected to the head-unit 110. The computer 1310 may be able to retrieve data from the remote sensors 210 by communicating with the head-unit 110. In addition, the computer 1310 may be able to control the remote sensors 210 by issue commands to the head-unit. The computer 1310 may retrieve data from the head-unit or issue commands to the head-unit using a website or similar communication means. The computer 1310 may be located near the Head-Unit 110 or remotely as shown. Alternatively, the computer 1310 can be located and connected anywhere near the DAS system.

In certain embodiments, the Remote Units 130 do not use DAS cable 135 and antenna 140 to further distribute the RF signal. The Remote Unit 130 in this case is the final stage of the DAS 100. In this case, a fiber cable may be the only cable utilized in the DAS system. In this case, the backhaul cabling 125 would be fiber optic cabling. In some cases, the fiber cable may be a hybrid cable which incorporates wire cable to transport DC power or Ethernet signals with power over Ethernet. To be operable with this DAS configuration, the remote sensor 210 may be embedded inside the Remote Unit 130 or attached to the backhaul cable 125.

Although features and elements are described above in particular combinations, one of ordinary skill in the art will appreciate that each feature or element can be used alone or in any combination with the other features and elements.

The probe 450 may measure environmental parameters such as airflow, liquid presence or level, pressure, smoke, pollen, audio, level fire, gases, heat, humidity, etc. In addition, the probe 450 may measure include sensors for personnel or materials/asset tracking, motion, occupancy. Further, the probe 450 may be of the form of a biological sensor, nuclear sensors, or chemical sensor (carbon monoxide/dioxide, methane, chlorine, etc.). In some embodiments, the probe 450 may measure AC or DC current or voltage, electrical resistance, infra-red light, visible spectrum light, acceleration, magnetic fields, rotation, pulses, etc. In addition, the relays 470 may receive an input from an electronic closure, mechanical closure, on-off keys or any similar type of input known in the art. In addition, the relays 470 may receive an input of pulse triggers or an input from a PID (proportional-integral-derivative) controller. In addition, the relays may output a contact closure, audible alarm, inaudible alarm or other output signal that can interface with other building system.

Furthermore, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. Examples of non-transitory computer-readable storage media include, but are not limited to, a read only memory (ROM), a random access memory (RAM), a register, cache memory, semiconductor memory devices, magnetic media, such as internal hard disks and removable disks, magneto-optical media, and optical media such as CD-ROM disks, and digital versatile disks (DVDs).

What is claimed is:

1. A sensor for a distributed antenna system (DAS), the sensor comprising:
   a connection to DAS module (CtD) that includes:
      an interface circuit that receives data and modulates the data at a predetermined out of band frequency to generate a modulated data signal, and
      a bidirectional radio frequency (RF) coupler that injects the modulated data signal on to cabling of the DAS, wherein the modulated data signal at the out of band frequency is received by a head-end unit of the DAS; and
   a remote sensor and control unit (RSC) communicatively coupled to the CtD that includes:
      a probe that obtains measurements of one or more environmental conditions,
      a memory,
      a CtD interface communicatively coupled to the interface circuit of the CtD, and
      a processor communicatively coupled to the probe, the memory and the CtD interface;
   wherein the processor:
      receives the measurements of the one or more environmental conditions from the probe, and
      transmits, using the CtD interface, the measurements of the one or more environmental conditions to the head-end unit of the DAS via the interface circuit and the bidirectional RF coupler of the CtD.

2. The sensor according to claim 1, wherein the memory stores calibration information for the probe, and the processor applies the calibration information to the data measured by the probe prior to transmitting the measurements of the one or more environmental conditions to the head-end unit.

3. The sensor according to claim 1, wherein the predetermined out of band frequency is set based on a command received from the head-end unit of the DAS.

4. The sensor according to claim 1, wherein the CtD further includes:
   a first filter that blocks RF signals transmitted along the cabling of the DAS and allows a DC power signal to pass to the interface circuit and the RSC, and
   a second filter that blocks the DC power signal and allows the RF signals to continue traverse the DAS cabling, wherein the RSC and the CtD are powered by the DC power signal.

5. The sensor according to claim 1, wherein the CtD further includes:
   a band pass RF filter that blocks transmission of signals at the predetermined out of band frequency from being transmitted by antennas of the DAS.

6. The sensor according to claim 1, wherein the modulated data signal is received by a remote unit of the DAS and the remote unit transmits the modulated data signal to another remote unit of the DAS.

7. The sensor according to claim 1, wherein the RSC is coupled to the CtD via a wireless communication channel.

8. A distributed sensor networking comprising:
   the head-end unit;
   a plurality of remote units communicatively coupled to the head-end unit via a first cabling;
   a plurality of antennas, wherein each of the plurality of antennas are coupled to one of the plurality of remote units by a second cabling; and
   a plurality of sensors according to claim 1, wherein the plurality of sensors are connected along the second cabling;
   wherein the plurality of sensors transmit the data signal to the head-end unit.

9. The distributed sensor network of claim 8, wherein at least one of the plurality of sensors is integrally formed in one of the plurality of remote units.

10. The sensor of claim 1, wherein the one or more environmental conditions include at least one of temperature, humidity, heat, smoke, and air quality.

11. A sensor for a distributed antenna system (DAS), the sensor comprising:
   a connection to DAS module (CtD) that includes:
      an interface circuit that receives data and modulates the data at a predetermined wavelength to generate a modulated data signal, wherein the modulated data signal is received by a head-end unit of the DAS,
      a bidirectional optical coupler that injects the modulated data signal on to cabling of the DAS, wherein the predetermined wavelength of the modulated data is unique from other wavelengths traversing the cabling of the DAS; and
   a remote sensor and control unit (RSC) communicatively coupled to the CtD that includes:
      a probe that obtains measurements of one or more environmental conditions,
      a memory,
      a CtD interface communicatively coupled to the interface circuit of the CtD, and
      a processor communicatively coupled to the probe, the memory and the CtD interface;
   wherein the processor:
   receives the measurement of the one or more environmental conditions from the probe, and
   transmits, using the CtD interface, the measurement of the one or more environmental conditions to the head-end unit of the DAS via the interface circuit and the a bidirectional optical coupler of the CtD.

12. The sensor of claim 11, wherein the one or more environmental conditions include at least one of temperature, humidity, heat, smoke, and air quality.

13. The sensor according to claim 12, wherein the memory stores calibration information for the probe, and the processor applies the calibration information to the data measured by the probe prior to transmitting the measurements of the one or more environmental conditions to the head-end unit.

14. The sensor according to claim 12, wherein the predetermined wavelength is set based on a command received from the head-end unit of the DAS.

15. The sensor according to claim 12, wherein the bidirectional optical coupler injects the modulated data signal without severing the cabling of the DAS.

16. The sensor according to claim 12, wherein the Ctd further includes:

a band pass optical filter that blocks transmission of signals at the predetermined wavelength from being transmitted to remote units of the DAS.

17. The sensor according to claim 12, wherein the modulated data is relayed by one or more other remote units of the DAS prior the head-end unit of the DAS receiving the modulated data.

18. The sensor according to claim 12, wherein the RSC is coupled to the CtD via a wireless communication channel.

19. A distributed sensor networking comprising:
   the head-end unit;
   a plurality of remote units communicatively coupled to the head-end unit via a first cabling;
   a plurality of antennas, wherein each of the plurality of antennas are coupled to the one of the plurality of remote units by a second cabling; and
   a plurality of sensors according to claim 12, wherein the plurality of sensors are connected along the first cabling;
   wherein the plurality of sensors transmit the data signal to the head-end unit.

20. The distributed sensor network of claim 19, wherein at least one of the plurality of sensors is integrally formed in one of the plurality of remote units.

* * * * *